United States Patent [19]

Campbell

[11] 4,383,821
[45] May 17, 1983

[54] AUTOMATIC SHUTOFF FOR SULFUR MELTER APPARATUS

[75] Inventor: Robert W. Campbell, Lafayette, Calif.

[73] Assignee: Chevron Research Company, San Francisco, Calif.

[21] Appl. No.: 236,561

[22] Filed: Feb. 20, 1981

[51] Int. Cl.³ .................. F27B 9/40; F27B 17/00; E01C 19/45
[52] U.S. Cl. .................. 432/43; 23/293 S; 126/343.5 R; 423/567 R; 432/188; 432/210
[58] Field of Search .................. 432/210, 211, 43, 188, 432/161; 126/343.5 R, 343.5 A; 23/293 S; 299/6, 14; 423/567 R

[56] References Cited

U.S. PATENT DOCUMENTS

| | | | |
|---|---|---|---|
| 1,378,084 | 5/1921 | Bacon et al. ...................... | 23/293 S |
| 2,001,344 | 5/1935 | Fielder .......................... | 126/343.5 A |
| 2,364,315 | 12/1944 | Powell .......................... | 126/343.5 R |
| 3,721,226 | 3/1973 | Childree et al. ................. | 126/343.5 A |
| 4,027,656 | 6/1977 | Geddes et al. .................. | 126/343.5 A |

Primary Examiner—John J. Camby
Attorney, Agent, or Firm—Burns, Doane, Swecker & Mathis

[57] ABSTRACT

A device for automatically shutting off a sulfur melter when its supply of sulfur is exhausted or when sulfur bridging has occurred is disclosed. The shutoff uses a temperature value sensed at the top of the melter's sloping melter bottom and shuts the heat off when the sensed temperature exceeds a preset value related to sulfur's melting temperature. The device avoids jamming and maintenance problems inherent in the use of mechanical level controls in a powdered/molten sulfur environment.

4 Claims, 2 Drawing Figures

AUTOMATIC SHUTOFF FOR SULFUR MELTER APPARATUS

BACKGROUND OF THE INVENTION

1. Field of the Invention

This invention relates to an automatic shut off device for an apparatus for melting powdered sulfur.

2. Background

United States patent application Ser. No. 236,560, filed of even date herewith is directed to an apparatus for melting powdered sulfur, particularly an on-site batch-type unit that finds use producing molten sulfur for incorporation into sulfur-based coatings and the like. The apparatus of that application has an expanded surface area sloping bottom and preferably employs combustion heating. As pointed out in that application, the melting of powdered sulfur is more difficult than might be expected because of the tendency of the material to form "bridges" away from the heating elements and its flamability when overheated.

The melter of that application is generally operated on a batch basis. In such a mode of operation, it is required to shut down the heat to the melter when the batch charge is melted and removed. Usual ways of effecting such control include (1) having a mechanical arm-like device that measures the top level of the solid sulfur load or (2) having a mechanical load-bearing weighing device mounted on the bottom of the box. Both of these devices would turn off the heat when the measuring mechanism has moved a predetermined distance. In a molten vaporous sulfur environment, use of such devices is not feasible because of jamming and corrosion problems. Additionally, such devices would not detect a bridge or jam which prevented solid sulfur present in the melter hopper from reaching the melting plate. A failure to promptly shut down the heat either when the load is exhausted or when bridging has occurred, could lead to overheating and fires.

SUMMARY OF THE INVENTION

The present invention seeks to eliminate or reduce the foregoing problems and disadvantages by providing a simple automatic heat shutoff for such sulfur melters.

In accordance with the present invention, an improvement is made in an apparatus for the on-site melting of powdered sulfur. The apparatus comprises a covered hopper for containing the sulfur and having a sloping extended surface bottom that is positioned at an angle of from 10° to 70° from horizontal and a heating element located beneath the sloping bottom so as to apply sulfur-melting heat directly to the sloping bottom. The lower edge of the sloping bottom is adapted to collect the molten sulfur and communicates with means for removing the molten sulfur from the melter. The sloping bottom causes the molten sulfur to run downhill. The improvement comprises locating temperature measuring means in the hopper at or about the sloping bottom's upper end, measuring the temperature at that location and, when that temperature exceeds a preset temperature related to the melting point of sulfur, as would occur either if the powdered sulfur supply becomes exhausted or if the sulfur managed to substantially bridge the melter's bottom surface, automatically shuting off or shuting down the heating element. Although any workable preset temperature may be employed, generally a preset shut down temperature of about 300° F. or greater, up to about 370° F., preferably about 315° F. to about 355° F. is employed. For reference, the melting point of sulfur is 252° F. such that the preset temperature is 48° F. to 123° F. above it and preferably 63° F. to 103° F. above it.

The invention will be further described in the following Description of Preferred Embodiments which is to be read in conjunction with the accompanying drawings.

DESCRIPTION OF PREFERRED EMBODIMENTS

Figure 1:
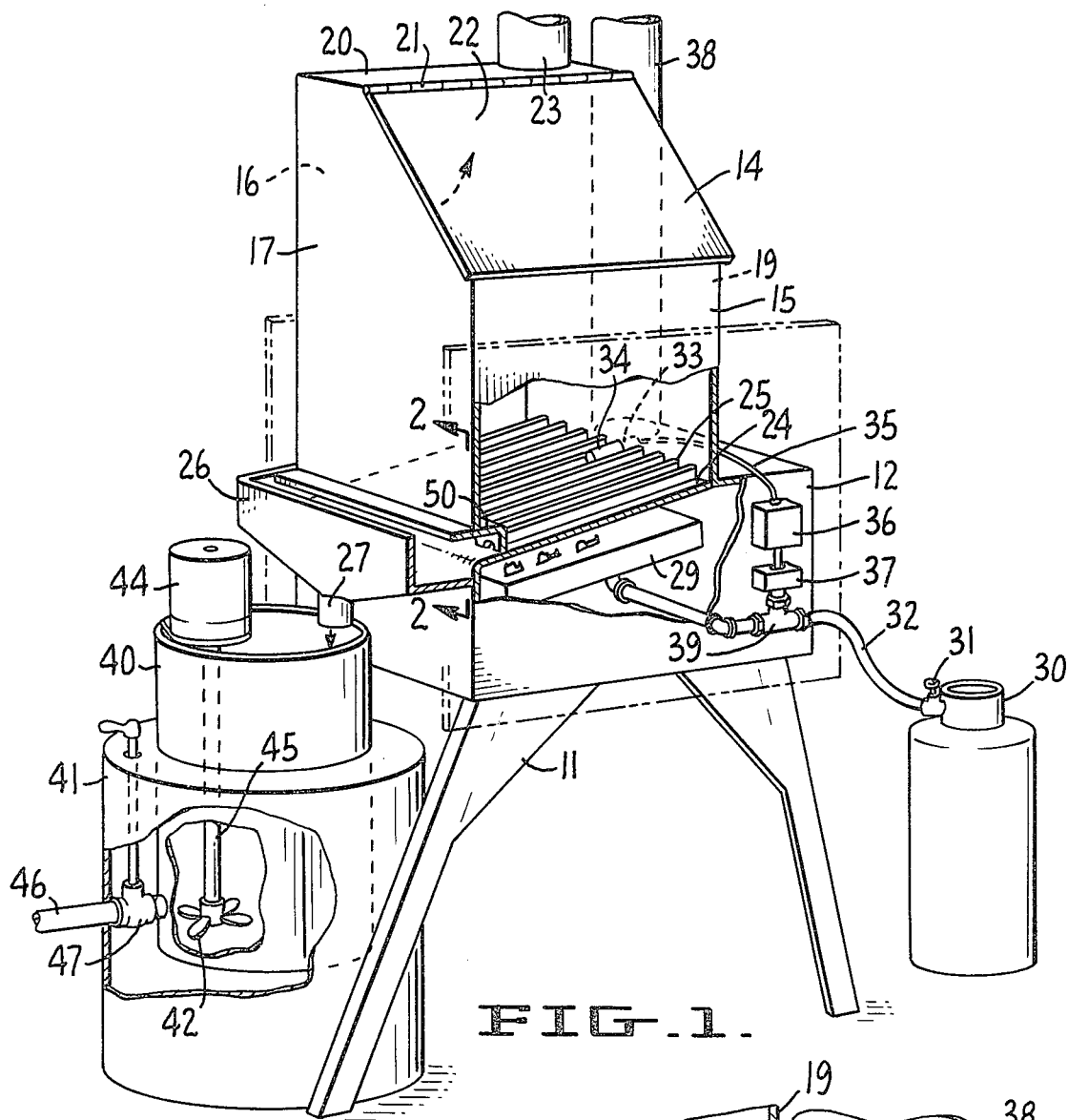
FIG. 1 is an isometric view of a sulfur melter incorporating the shutoff of this invention.

Referring to FIG. 1 a melter employing the present invention is shown. It includes a lower frame 11 which supports combustion box 12 which in turn engages and supports melter hopper 14. Hopper 14 includes sidewalls 15 and 16, front wall 17, back wall 19, and cover 20 to which is affixed, via hinge 21, cover door 22 through which powdered sulfur to be melted is added. Cover 20 also carries hopper vent pipe 23. The bottom of hopper 14 is defined by sloped planar bottom surface 24 which is joined to walls 15, 16 and 19. The angle at which bottom section 24 meets sidewalls 15 and 16 is between about 10° and about 70° from horizontal, preferably between about 15° and about 60° from horizontal. Bottom 24 has an expanded surface provided by a plurality of added ridges 25 affixed thereto parallel to the slope of hopper bottom 24. The front (lower) end of ridges 25 and bottom 24 do not contact front wall 17 but instead communicate with molten sulfur collection trough 26. Trough 26 runs into and empties via discharge spout 27. A heating element, herein embodied as burner assembly 29 is located in combustion box 12 below bottom 24 so that in operation its output heats bottom 24 and ridges 25. Bottom 24, and any surface-expanding attachments thereto are fabricated of a heat-transmitting noninsulating material, preferably a metal such as steel or aluminum, so that heat from burner 29 is readily transmitted to the sulfur in contact therewith. As this embodiment is a portable one, it is suitably gas fired. Gas supplied from tank 30 is delivered through valve 31 and line 32 to burner assembly 29. Burner assembly 29 is ignited by means not shown. The low sulfur level temperature sensor 33 is located in tube 34 positioned in hopper 14 at the top end of sloping bottom 24. The end of the tube 34 inside hopper 14 is sealed. The other end extends out of hopper 14. Sensor 33, suitably a termocouple or the like is positioned inside 34 and is connected via lead 35 to adjustable thermostat 36 which directs valve controller 37 to close valve 39 thereby shuting off burner 29 when the temperature sensed by sensor 33 exceeds a preset value as occurs when the level of sulfur in hopper 24 drops below tube 34. Flue 38 carries away products of combustion generated by burner 29.

Sulfur melted at the surface of bottom 24 of hopper 14 runs down sloped bottom 24 into trough 26 and out through discharge spout 27. Trough 26 and spout 27 are heavy gauge metal so that heat from burner 29 conducts to them and keeps them at a temperature above sulfur's melting point. Spout 27 discharges molten sulfur into lower mixing pot 40 that is surrounded by insulation or heater 41 for use in coating preparations. Other coating components such as fillers, resins, and the like are added to pot 40 as well and therein mixed with the molten sulfur using agitator 42 driven by motor 44 via drive shaft 45. The resulting coating mixture is taken off through draw pipe 46 equipped with valve 47 and thereafter applied as required.

Figure 2:
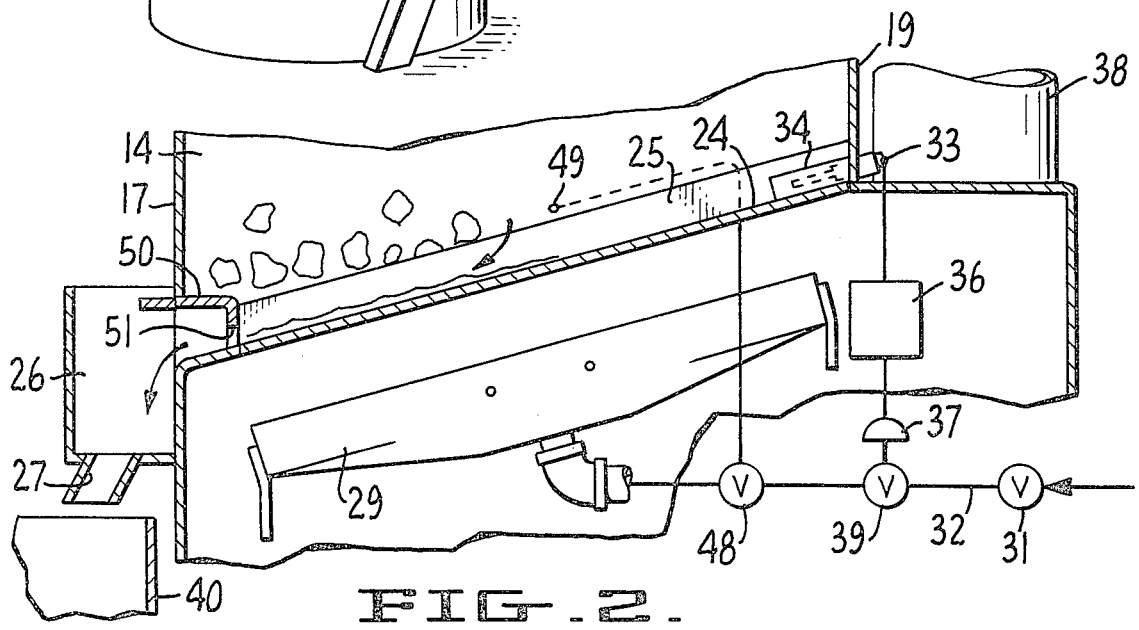
FIG. 2 is an elevational cross-sectional view taken at line 2—2' of FIG. 1 of the sloped bottom of a melter showing the placement of the heat sensor employed in this invention.

In FIG. 2 the sloping bottom area of a melter and the position of the temperature sensor of this invention is detailed. Melter hopper 14, enclosed by front wall 17, back wall 19 and sloping bottom 24 with ridges 25 is mounted over combustion box 12 vented by flue 38. Burner assembly 29 is mounted on box 12 and supplied gas via gas line 32. The flow of gas to burner 29 is regulated by tank valve 31 and low sulfur level shut off valve 39 controlled by valve controller 37 in response to signals sent by thermostat 36 in turn in response to temperatures sensed by temperature sensor 33 located in sensor tube 34 positioned at the top end of the top surface of bottom plate 24. Optionally a third valve 48 could be positioned in line 32 to control the temperature of the bulk molten sulfur by regulating the flow of gas based on temperature sensed by sensor 49 positioned in the melt area but somewhat away from bottom 24. Sulfur melted on bottom 24 runs down and passes through trough entrance 50 which very suitably contains holes 51 that permit molten sulfur to pass but generally restrict solid particles and hold them up on bottom 24 until they melt. The molted sulfur then enters trough 26 and exits via discharge spout 27, as previously described.

It will be understood that although the sloping bottom melter apparatus of this invention has been described and illustrated with reference to particular embodiments, those skilled in the art will readily appreciate variations that can be introduced in the apparatus while still remaining within the purview of this invention as set forth in the claims.

What is claimed is:

1. In a sulfur powder melting apparatus comprising covered sulfur-containing hopper means having a heat transmitting bottom plate sloped at an angle from 10° to 70° from horizontal, combustion heating means located beneath said bottom plate to directly heat said bottom plate and melt sulfur in contact therewith, molten sulfur collecting means communicating with said bottom plate and located at the lower end of said bottom plate sloped at an angle of from 10° to 70° and molten sulfur discharge means exiting said molten sulfur collection means the improvement which comprises an automatic shutoff for said heating means, which shutoff comprises temperature sensor means located at or about the top surface of the upper end of said sloped bottom plate and connected to means for shutting off the heating means when the temperature sensed by said sensor exceeds a preset temperature related to the melting point of sulfur.

2. The sulfur powder melting apparatus as defined by claim 1 wherein said combustion heating means is a gas burner.

3. The sulfur powder melting apparatus as defined by claim 2 wherein said preset temperature is a temperature in the range of from 48° F. to 123° F. above the melting temperature of sulfur.

4. The sulfur powder melting apparatus as defined by claim 2 wherein said preset temperature is a temperature in the range of from 63° F. to 103° F. above the melting temperature of sulfur.

* * * * *